(12) United States Patent
Drysdale

(10) Patent No.: US 6,643,977 B1
(45) Date of Patent: Nov. 11, 2003

(54) GROUND ENGAGING BOUNDARY ELEMENT

(76) Inventor: Warwick Drysdale, 27 Tennyson Ave., Turramurra NSW 2074 (AU)

( * ) Notice: Subject to any disclaimer, the term of this patent is extended or adjusted under 35 U.S.C. 154(b) by 0 days.

(21) Appl. No.: 10/049,870

(22) PCT Filed: Aug. 11, 2000

(86) PCT No.: PCT/AU00/00956
§ 371 (c)(1),
(2), (4) Date: Feb. 12, 2002

(87) PCT Pub. No.: WO01/11943
PCT Pub. Date: Feb. 22, 2001

(30) Foreign Application Priority Data

Aug. 12, 1999 (AU) ............................................. PQ7802

(51) Int. Cl.⁷ ................................................ A01G 1/00
(52) U.S. Cl. .......................................................... 47/33
(58) Field of Search ............................................. 47/33

(56) References Cited

U.S. PATENT DOCUMENTS

| | | | | |
|---|---|---|---|---|
| 352,146 A | * | 11/1886 | Oungst | 47/33 |
| 3,269,070 A | * | 8/1966 | Stoy | 52/249 |
| 3,724,128 A | * | 4/1973 | Tabone | 47/33 |
| 3,951,294 A | * | 4/1976 | Wilson | 220/4.31 |
| 4,391,077 A | * | 7/1983 | Giess | 52/233 |
| 5,337,527 A | * | 8/1994 | Wagenaar | 405/284 |
| 5,375,369 A | * | 12/1994 | VerHoeve | 47/33 |
| 5,414,956 A | | 5/1995 | Kheradpir | |
| 5,615,529 A | * | 4/1997 | Johnson et al. | 47/33 |

FOREIGN PATENT DOCUMENTS

| | | |
|---|---|---|
| AU | 45750/96 | 9/1996 |
| DE | 3837815 | 12/1989 |

* cited by examiner

*Primary Examiner*—Charles T. Jordan
*Assistant Examiner*—Bret Hayes
(74) *Attorney, Agent, or Firm*—Timothy J. Keefer; Wildman, Harrold, Allen & Dixon

(57) ABSTRACT

Ground engaging boundary element (10) comprises opposing edge portions and earth engaging means (26) for anchoring element (10) in the earth. Earth engaging means (26) is formed at lower edge portion (18) of element (10). At least one of the opposing edge portions includes interlocking means (22) for joining to an adjacent ground engaging boundary element. Interlocking means (22) comprises complementary-shaped tongue or groove members and extends partially along each edge portion to adjacent lower edge portion (18). In use, earth engaging means (26) together with part of interlocking means (22) is embedded in the earth, and upper portion (24) of element (10) conceals interlocking means (22). The opposing edge portions of element (10) are also shaped to permit articulation of adjacent interlocked elements so as to provide for a non-linear elongated boundary structure.

10 Claims, 3 Drawing Sheets

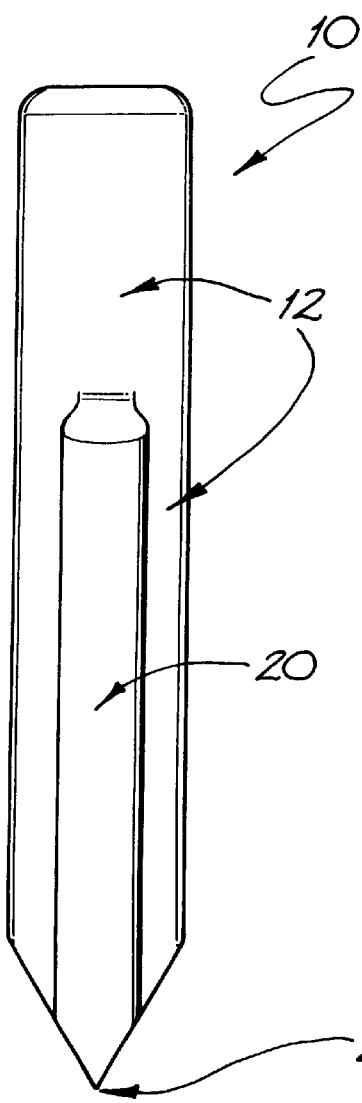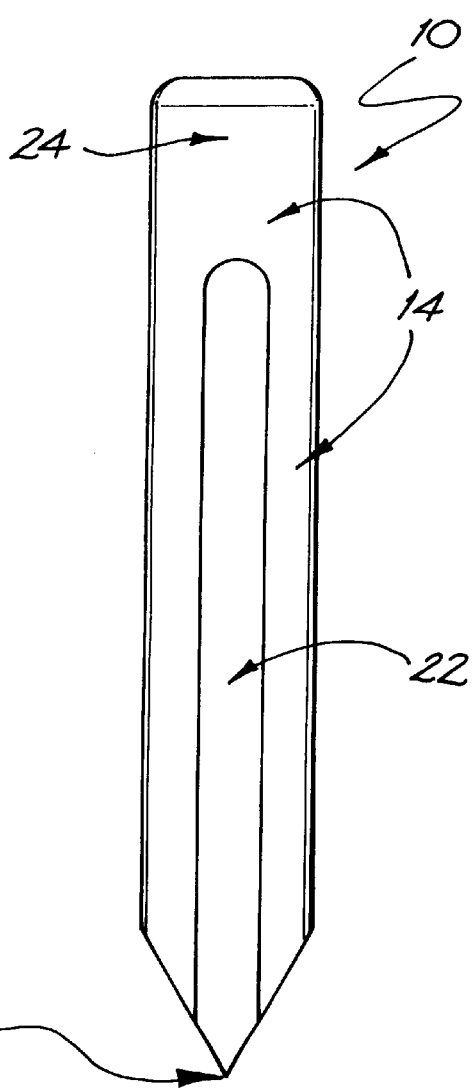
FIG. 4   FIG. 5
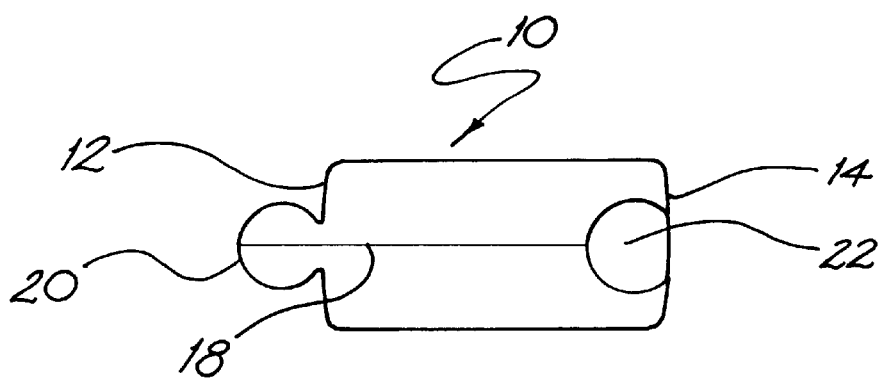
FIG. 6

GROUND ENGAGING BOUNDARY ELEMENT

CROSS REFERENCE TO RELATED APPLICATIONS

This application claims the priority of Australian patent application Serial No. PQ 7802, filed on Aug. 12, 1999.

FIELD OF THE INVENTION

The present invention relates generally to a ground engaging boundary element. In one form the invention relates particularly to a series of interlocked ground engaging elements together forming garden edging, and will primarily be described with reference to this context. It should be remembered, however, that the invention can have broader use in other wall construction applications to provide a barrier between two areas, for example to conceal goods or machinery from view.

BACKGROUND ART

There have been numerous systems proposed in the art for the fabrication of garden edges and retaining structures. In all cases the wall systems proposed do not have ease of installation in either straight or curved runs while allowing for undulations in ground levels and with sufficient strength to retain earthen material. Many thin-walled devices have been proposed but do not have sufficient strength for the majority of applications where reasonable retaining properties are required. Distortion of the garden edging elements can occur.

The garden edging element of the specification of Australian Patent No. 666428 includes as an essential element a stabilising member which makes the device complicated and cumbersome to install in the ground. The specification of U.S. Pat. No. 5,414,956 and German Patent No. 3837815, disclose interlocking garden edging having abutting adjacent edges of adjacent modules. These edging modules do not permit pivoting of adjacent modules so that installation can only occur in straight or fixed configurations.

These prior art specifications do not form part of the common general knowledge in the relevant art.

SUMMARY OF THE INVENTION

The present invention provides a ground engaging boundary element comprising:

opposing edge portions at least one of which includes interlocking means being adapted to interlock with an adjacent element to form a section of an elongate boundary structure, said interlocking means being configured to allow articulation of the adjacent elements; and earth engaging means formed at a lower edge portion of said element and being adapted to embed in the ground, the interlocking means extending to or adjacent the lower edge portion of the boundary element whereby the earth engaging means together with at least part of the interlocking means is embedded in the earth.

Preferably the opposing edge portions in cross section each include a convex shaped surface being adapted to permit articulation of the adjacent interlocked elements so as to provide for non-linear elongate boundary structure.

Preferably the interlocking means comprises either a tongue member or a groove member being shaped complementary to one another and located on opposite edge portions of the element. More preferably the tongue member or the groove member are shaped partly circular in cross section. Most preferably the tongue member is a T-ball tongue member and the groove member is a T-bar slot member.

Preferably the tongue and groove members in the edge portions extend part way therealong such that the members do not extend to an upper edge portion of the element. More preferably when the element is interlocked with an adjacent element in use the tongue and groove members are concealed by the upper edge portion of the element.

Preferably the tongue member is of a reduced length relative to the groove member in use to permit height variation between interlocked elements while still providing concealment of the tongue and groove members.

Preferably the earth engaging means comprises a bevelled lower edge on the element and on the tongue and groove members to facilitate insertion into the earth.

BRIEF DESCRIPTION OF THE DRAWINGS

Notwithstanding any other forms which may fall within the scope of the present invention, a preferred form of the invention will now be described, by way of example only, with reference to the accompanying drawings in which:

FIG. 4 shows a left side view of the embodiment shown in FIG. 1.

FIG. 5 shows a right side view of the embodiment shown in FIG. 1.

FIG. 6 shows a lower view of the embodiment shown in FIG. 1.

MODES FOR CARRYING OUT THE INVENTION

Figure 1:
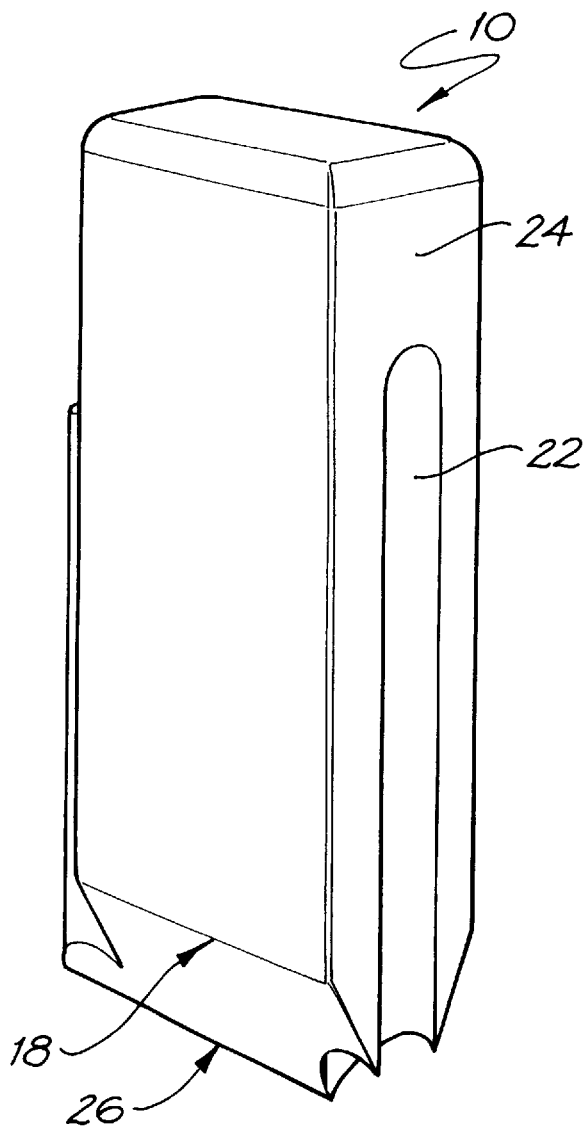
FIG. 1 shows a perspective view of one embodiment of a ground engaging boundary element for partial embedding in the ground in accordance with the invention.
Figure 3:
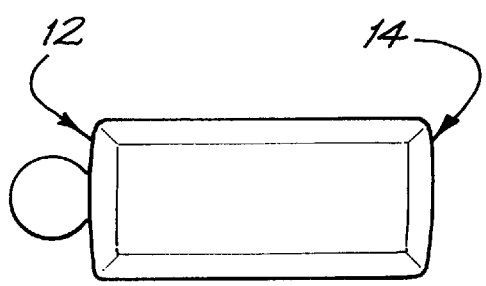
FIG. 3 shows a top view of the embodiment shown in FIG. 1.
Figure 2:
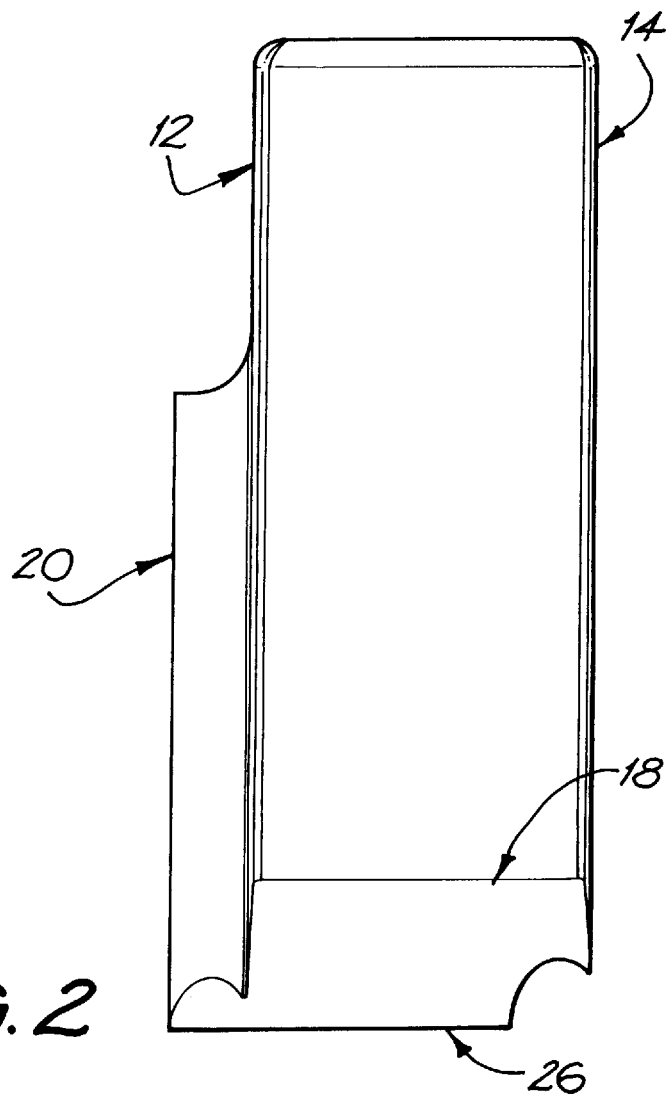
FIG. 2 shows a front or rear view of the embodiment shown in FIG. 1.
Figure 7:
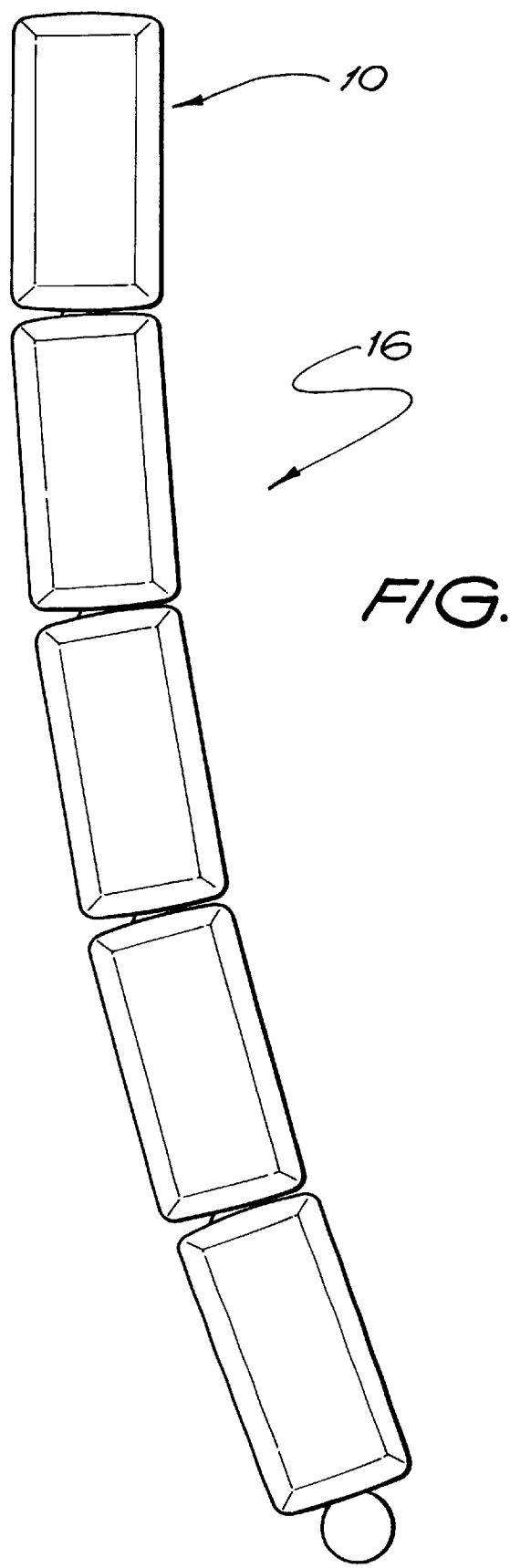
FIG. 7 shows a top view of the embodiment shown in FIG. 1 showing interlocked boundary elements.

Referring to the drawings, a ground engaging boundary element 10 is shown, with the element comprising opposing edge portions 12 and 14 at least one of which includes interlocking means for joining to an adjacent element 16 to form an elongate boundary structure and earth engaging means for anchoring the element 10 in the earth.

The earth engaging means is formed at a lower edge portion 18 of element 10, the interlocking means extending to that lower edge portion 18 so that in use the earth engaging means together with at least part of the interlocking means is embedded in the earth. This facilitates insertion of the element into the earth, as no part of the interlocking means presents a flat face or area of resistance to the insertion process. The presence of part of the interlocking means in the earth also inhibits or restricts articulation of the boundary structure when in place and embedded in the ground.

The interlocking means comprises either a tongue or a groove member each partly circular in cross-section and shaped complementary to one another, and located respectively on opposite edge portions of the element. Typically the tongue member is a T-ball tongue member 20 and the groove member is a T-bar slot member 22. The use of a tongue 20 and slot 22 can be replaced by alternative linking means, such as a tongue protrusion complementary with a groove socket or finger protrusion/s complementary with groove socket/s. Continual vertical abutment between elements is provided by the interlocking means which provides a retention barrier against the passage of, for example, soil and moisture from the garden or lawn so edged. The interlocking joint does not require additional fixing agents to prevent lateral movement in any direction.

The opposing edge portions 12 and 14 of element 10, which are adapted to interlock with an adjacent element, are shaped to permit articulation of adjacent interlocked elements so as to provide for a non-linear elongated boundary structure. In cross section the edge portions 12 and 14 have a convex shaped surface. This allows the installation of, for example, a garden edging or retaining structure in either straight or curved, circular or irregular runs while providing a high degree of strength.

The tongue 20 and slot 22 members in the edge portions 12 and 14 extend part way therealong such that when the element 10 is interlocked with an adjacent element 16 in use, the tongue 20 and slot 22 members are concealed by an upper portion 24 of the element 10. This is a pleasing aesthetic modification and also ensures that moisture or garden earth cannot penetrate the jointing mechanism from the upper surface of the element, which otherwise may allow the growth of weeds or grass within the interlocking mechanism of the retaining wall itself.

The earth engaging means comprises a bevelled lower edge 26 on the element 10 and on the tongue 20 and slot 22 members to facilitate insertion into the earth. Simply tapping or pushing the top of the element will cause it to enter into the earth. There is no requirement to pre-prepare a trench or for the operator to have special skills or tools for the task.

The materials of construction of the ground engaging boundary elements can be timber, plastic, stone or concrete or any other materials suitable for use in the damp earth environment. The elements may also be of any shape to allow convenient vertical installation and interlocking of adjacent elements.

It is anticipated that some members may have the same top section detail as others but be longer in length, having the same cross-sectional detail as the lower portion of shorter members, to be installed at any interval to provide further retaining wall strength.

The garden edging and retaining structures of this embodiment of the invention use similar shaped interlocking members to offer both a high degree of strength along with a concealed interlocking or jointing mechanism that allows variable rotation at the joints. This rotation or articulation is then restricted when the interlocking means, such as the tongue and groove, which extend to or adjacent to the lower edge portion are embedded in the ground. The abutting of the opposing edges of adjacent elements permits articulation so that installation can occur in either straight or curved runs depending upon the particular requirements. The depth of insertion of pieces of such garden edging into the earth is fully regulated by the operator, since the interlocking or jointing mechanism is adapted for insertion in the ground as well as the body of the element. Thus the garden edge structure can be installed into even or rapidly undulating earth levels and varying ground heights on either side of the edging, and can deal with obstacles such as buried cables and tree roots, while having the inherent strength to withstand horizontal ground forces, and without exposing the interlocking joint detail. The garden edge structure is also able to be dismantled and re-positioned at will, should this be called for.

Whilst the invention has been described with reference to a number of preferred embodiments it should be appreciated that the invention can be embodied in many other forms.

In the claims that follow and in the summary of the invention, except where the context requires otherwise due to express language or necessary implication, the word "comprising" is used in the sense of "including", i.e. the features specified may be associated with further features in various embodiments of the invention.

What is claimed is:

1. A ground engaging boundary element comprising:
   opposing edge portions at least one of which includes interlocking means being adapted to interlock with an adjacent element to form a section of an elongate boundary structure, said interlocking means being configured to allow articulation of the adjacent elements; and
   earth engaging means formed at a lower edge portion of said element and being adapted to embed in the ground, the interlocking means extending to or adjacent the lower edge portion of the boundary element whereby the earth engaging means together with at least part of the interlocking means is embedded in the earth,
   the interlocking means including a tongue member or a groove member shaped complementary to one another wherein the tongue member or the groove member extend part way along the edge portion and do not extend to an upper edge portion of the element.

2. A ground engaging boundary element as claimed in claim 1 wherein the opposing edge portions in cross section each include a convex shaped surface being adapted to permit articulation of the adjacent interlocked elements so as to provide for non-linear elongate boundary structure.

3. A ground engaging boundary element as claimed in claim 2 wherein the tongue member or the groove member are shaped partly circular in cross section.

4. A ground engaging boundary element as claimed in claim 3 wherein the tongue member is a T-ball tongue member and the groove member is a T-bar slot member.

5. A ground engaging boundary element as claimed in claim 4 wherein the tongue and groove members in the edge portions extend part way therealong such that the members do not extend to an upper edge portion of the element 6. A ground engaging boundary element as claimed in claim 1 wherein the element is interlocked with an adjacent element in use in the tongue and groove members are concealed by the upper edge portions of the element.

7. A ground engaging boundary element as claimed in claim 6 wherein the tongue member is of a reduced length relative to the groove member in use to permit height variation between interlocked elements while still providing concealment of the tongue and groove members.

8. A ground engaging boundary element as claimed in claim 7 wherein the earth engaing means comprises a bevelled lower edge on the element and on the tongue and groove members to facilitate insertion into the earth.

9. A ground engaging boundary element as claimed in claim 1 wherein the tongue member or the groove member are shaped circular in cross section.

10. A ground engaging boundary element as claimed in claim 9 wherein the tongue member is a T-ball tongue member and the groove member is a T-bar slot member.

* * * * *